US007852617B2

(12) United States Patent
Lee

(10) Patent No.: US 7,852,617 B2
(45) Date of Patent: Dec. 14, 2010

(54) MAIN CIRCUIT TERMINAL ASSEMBLY FOR VACUUM CIRCUIT BREAKER

(75) Inventor: Jae-Yong Lee, Chungcheongbuk-Do (KR)

(73) Assignee: LS Industrial Systems Co., Ltd., Gyeonggi-Do (KR)

( * ) Notice: Subject to any disclaimer, the term of this patent is extended or adjusted under 35 U.S.C. 154(b) by 52 days.

(21) Appl. No.: 12/415,178

(22) Filed: Mar. 31, 2009

(65) Prior Publication Data

US 2009/0255905 A1 Oct. 15, 2009

(30) Foreign Application Priority Data

Apr. 10, 2008 (KR) ..................... 10-2008-0033336

(51) Int. Cl.
*H02B 1/04* (2006.01)

(52) U.S. Cl. ....................... 361/676; 361/652; 361/673; 439/291; 200/540; 218/118; 324/117 R

(58) Field of Classification Search ................ 361/93.1, 361/111, 117, 600, 601, 673, 676, 688
See application file for complete search history.

(56) References Cited

U.S. PATENT DOCUMENTS 4,992,906 A * 2/1991 Doone et al. ................ 361/117
6,442,011 B1 * 8/2002 Attarian et al. ............ 361/93.1
2007/0264856 A1 * 11/2007 Erk et al. .................... 439/291
2008/0053810 A1 * 3/2008 Hering et al. ............... 200/540
2009/0014301 A1 1/2009 Sohn
2009/0014417 A1 1/2009 Park
2009/0015357 A1 1/2009 Ahn
2009/0015990 A1 1/2009 Kim et al.
2009/0039988 A1 2/2009 Song et al.

FOREIGN PATENT DOCUMENTS

WO 2006/040243 4/2006
WO 2009/074016 6/2009

* cited by examiner

*Primary Examiner*—Jayprakash N Gandhi
*Assistant Examiner*—Courtney Smith
(74) *Attorney, Agent, or Firm*—Greenblum & Bernstein P.L.C.

(57) ABSTRACT

The present invention is to provide a main circuit terminal assembly for a vacuum circuit breaker, which can prevent temperature increase by increasing a surface area of a main circuit conductive unit, the main circuit terminal assembly for a vacuum circuit breaker which is electrically connected to a vacuum interrupter, including: a clamp electrically connected to a movable unit of the vacuum interrupter, and configured as a pair of conductors so as to support the movable unit by clamping; a heat sink fixed to the clamp that increase a surface area of the clamp; a flexible shunt having one end thereof electrically and mechanically connected to the clamp, and configured as a flexible conductor to allow the movable unit to move; a terminal block electrically and mechanically connected to another end of the flexible shunt, and configured as an electrical conductor; and a contactor unit electrically connected to the terminal block and having a plurality of clip-shaped contactors.

7 Claims, 3 Drawing Sheets

MAIN CIRCUIT TERMINAL ASSEMBLY FOR VACUUM CIRCUIT BREAKER

RELATED APPLICATION

The present disclosure relates to subject matter contained in priority Korean Application No. 10-2008-0033336, filed on Apr. 10, 2008, which is herein expressly incorporated by reference in its entirety.

BACKGROUND OF THE INVENTION

1. Field of the Invention

The present invention relates to a vacuum circuit breaker, and more particularly, to a main circuit terminal assembly for a vacuum circuit breaker.

2. Description of the Background Art

In general, a vacuum circuit breaker is an electrical device to protect load equipment and an electrical line from an overload or overcurrent which may occur in an electrical circuit due to an accident in the circuit (e.g., a short-circuit, or the like), by breaking the electrical circuit. Considering recent installation environment of such vacuum circuit breaker which requires a small installation area as well as a large capacity, a small-sized vacuum circuit breaker has been developed to conduct a large rated current therethrough. Accordingly, temperature increase of the vacuum circuit breaker by the large current has been considered as an important issue.

In the vacuum circuit breaker, a main circuit unit includes a vacuum interrupter having a fixed contact and a movable contact for opening or closing a circuit in a vacuum container, and a terminal unit for respectively being connected to the fixed contact and the movable contact of the vacuum interrupter and being connected to a circuit between a power source and an electrical load. In such main circuit unit, heat is mainly generated in a main conductive unit including a bus bar of the terminal unit, a connection terminal for a connection with the circuit, a clamp for connecting the bus bar to the vacuum interrupter.

However, in the main circuit terminal assembly for the conventional vacuum circuit breaker, the clamp does not have enough surface area as well as any means for effective heat radiation, thus to make it difficult to prevent temperature increase of a conductor.

SUMMARY OF THE INVENTION

Therefore, it is an object of the present invention to provide a main circuit terminal assembly for a vacuum circuit breaker which can effectively prevent temperature increase by increasing a surface area of a clamp for connecting a vacuum interrupter and a terminal unit.

Said object of the present invention can be achieved by providing a main circuit terminal assembly for a vacuum circuit breaker according to the present invention which is electrically connected to a vacuum interrupter, comprising:

a clamp electrically connected to a movable unit of the vacuum interrupter, and configured as a pair of conductors so as to support the movable unit by fitting it thereinto;

a heat sink fixed to the clamp so as to increase a surface area of the clamp;

a flexible shunt having one end thereof electrically and mechanically connected to the clamp, and configured as a flexible conductor to allow the movable unit to move;

a terminal block electrically and mechanically connected to another end of the flexible shunt, and configured as an electrical conductor; and a contactor unit electrically connected to the terminal block and having a plurality of clip-shaped contactors.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail of the preferred embodiments of the present invention, examples of which are illustrated in the accompanying drawings.

Figure 1:
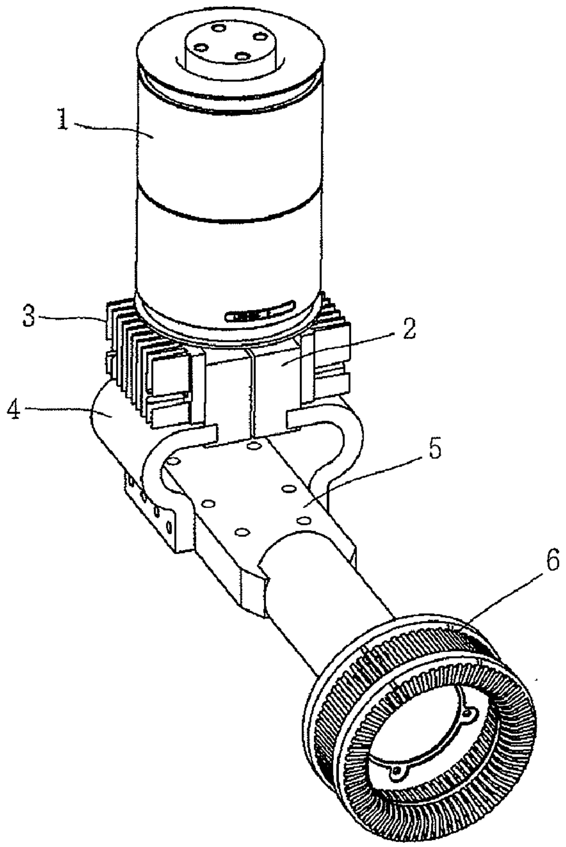
FIG. 1 is a perspective view showing a structure of a main circuit terminal assembly for a vacuum circuit breaker according to one exemplary embodiment of the present invention.
Figure 2:
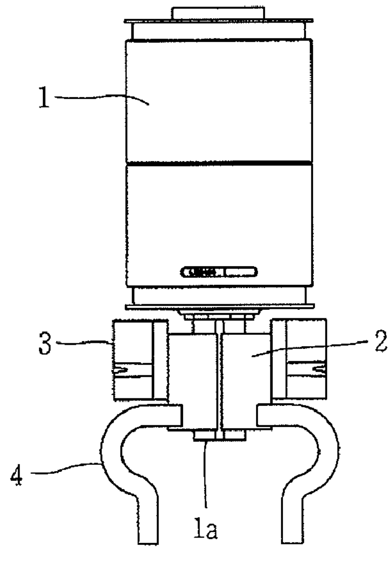
FIG. 2 is a side view showing the structure of the main circuit terminal assembly for the vacuum circuit breaker according to one exemplary embodiment of the present invention.

Referring to FIGS. 1 and 2, the main circuit terminal assembly for a vacuum circuit breaker according to the present invention is a device for electrically being connected to a vacuum interrupter 1, and includes a clamp 2, a heat sink 3, a flexible shunt 4, a terminal block 5, and a contactor unit 6.

The vacuum interrupter 1 is generally configured to open or close contacts in a vacuum inner space of a cylindrical vacuum container configured of a ceramic material. A fixed contact and a movable contact are provided inside the vacuum container. The vacuum interrupter 1 has a movable unit 1*a* connected to the movable contact so as to be movable to open position or close position of the movable contact, and extending to an outside of the vacuum container. As shown in FIG. 2, the movable unit 1*a* is downwardly extended from the vacuum interrupter 1.

The clamp 2 is electrically connected to the movable unit 1*a* of the vacuum interrupter 1. The clamp 2 is implemented as a pair of electrical conductors such that the movable unit 1*a* is supported by being fitted therein. Preferably, the clamp 2 is configured of pure copper with an excellent conductivity to function as an electrical conductive path. Descriptions of detailed construction of the clamp 2 will be given with reference to FIG. 3.

The heat sink 3 is fixed to the clamp 2 so as to increase a surface area of the clamp 2. Preferably, the heat sink 3 may be manufactured by aluminum molding. Descriptions of a detailed construction of the heat sink 3 will be given with reference to FIG. 4.

The flexible shunt 4 has one end thereof electrically and mechanically (electrically and mechanically) connected to the clamp 2, and is configured as a flexible electrical conductor to enable the movement of the movable unit 1*a*. Preferably, in order to perform a main function serving as the electrical conductive path, the flexible shunt 4 may be configured in which a plurality of thin films configured of pure copper having an excellent conductivity are laminated, and both ends thereof are compressed and welded.

The terminal block 5 is electrically and mechanically connected to another end (i.e., opposite to the one end connected to the clamp) of the flexible shunt 4, and may be implemented as an electrical conductor, such as a copper alloy (e.g., pure cooper, brass, or the like).

The contactor unit 6 is configured as an electrical conductor and is electrically connected to the terminal block 5. The contactor unit 6 includes a plurality of clip-shaped contactors. Here, the clip-shaped contactors are configured in which a plurality of conductive bars, so called 'fingers,' configured as an electrical conductor are arranged in a cylindrical shape, and the plurality of conductive bars are fastened by a ring having elasticity so as to prevent a separation of the conductive bars and to restore its original shape. The clip-shaped contactors in a conventional vacuum circuit breaker are electrically and mechanically connected to a terminal unit of a cradle having connection terminal units for a power source side and an electrical load side.

Meanwhile, description of the clamp in the main circuit terminal assembly for a vacuum circuit breaker according to the present invention will be given with reference to FIG. 3.

In order to maximize an installation space of the heat sink 3 by minimizing an area being connected by the flexible shunt 4, the clamp 2 includes horizontal slit portions 2*b* and 2*b*' for fitting (inserting) respective end portions of the flexible shunt 4 thereto. Here, the slit portions 2*b* and 2*b*' and the end portions of the flexible shunt 4 are connected by welding. Referring to FIG. 3, the clamp 2 is comprises a pair of clamp pieces: a first clamp piece 2*a* and a second clamp piece 2*a*'. The first and second clamp pieces 2*a* and 2*a*' include upper surface portions 2*f* for mounting the heat sink 3 thereon, and the slit portions 2*b* and 2*b*' disposed at a lower portion thereof for fitting the respective end portions of the flexible shunt 4 thereinto. In addition, the first and second clamp pieces 2*a* and 2*a*' have movable unit supporting grooves 2*c* and 2*c*' each vertically extending from a central portion of a rear surface thereof and having a semicircular cross section such that the movable unit 1*a* of the vacuum interrupter 1 is fitted thereinto so as to be supported. In addition, each of the first and second clamp pieces 2*a* and 2*a*' includes four clamp fastening means insertion holes 2*d* for allowing to insert clamp fastening means (not shown). The insertion holes 2*d* are penetratingly configured at the front surfaces of the first and second clamp pieces 2*a* and 2*a*' toward the rear surfaces thereof. The clamp fastening means is a means to support the movable unit 1*a* of the vacuum interrupter 1 while fastening the first and second clamp pieces 2*a* and 2*a*'. Preferably, the clamp fastening means, although not shown, may comprises bolts and nuts sized to be inserted into the insertion holes 2*d*. The first and second clamp pieces 2*a* and 2*a*' may respectively have heat sink fixing screw insertion holes 2*e* disposed at both sides (right and left) thereof such that screws for fixing the heat sink 3 are inserted thereinto. The heat sink fixing screw insertion holes 2*e* may be configured as female threaded holes by a tapping process. Although not shown, the fixing screws to be inserted into the heat sink fixing screw insertion holes 2*e* generally includes a threaded portion tapering to a point at one end with a helical ridge configured on it, and a head portion at the other end thereof with screwdriver insertion grooves.

Figure 4:
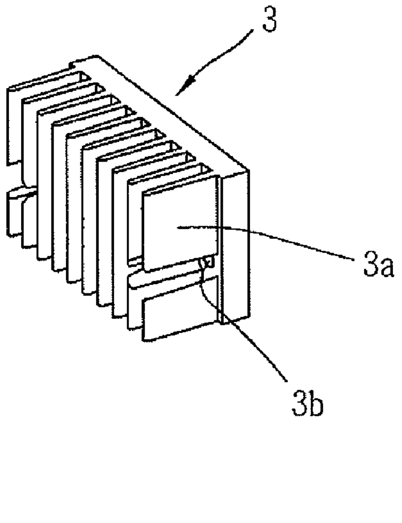
FIG. 4 is a perspective view showing a heat sink in the main circuit terminal assembly for the vacuum circuit breaker according to one exemplary embodiment of the present invention.

Meanwhile, descriptions of the detailed structure and installation of the heat sink in the main circuit terminal assembly for a vacuum circuit breaker will be given in detail with reference to FIGS. 4 and 1. FIG. 4 is a perspective view showing a heat sink in the main circuit terminal assembly for the vacuum circuit breaker according to one exemplary embodiment of the present invention.

Referring to FIG. 4, the heat sink 3 includes a plurality of cooling fins 3*a* vertically extending and spaced from each other at a predetermined interval so as to form a convection passage (flow) of air between the cooling fins 3*a*. In addition, the heat sink 3 is positioned, as shown in FIG. 1, such that the cooling fins 3*a* are vertically extended, thus to form a plurality of convection passages of air between the cooling fins 3*a*. As shown in FIG. 4, a pair of fixing screw holes 3*b* are provided at both ends of the heat sink 3 so as to fix the heat sink 3 onto the upper surface portion 2*f* of the clamp 2.

Figure 5:
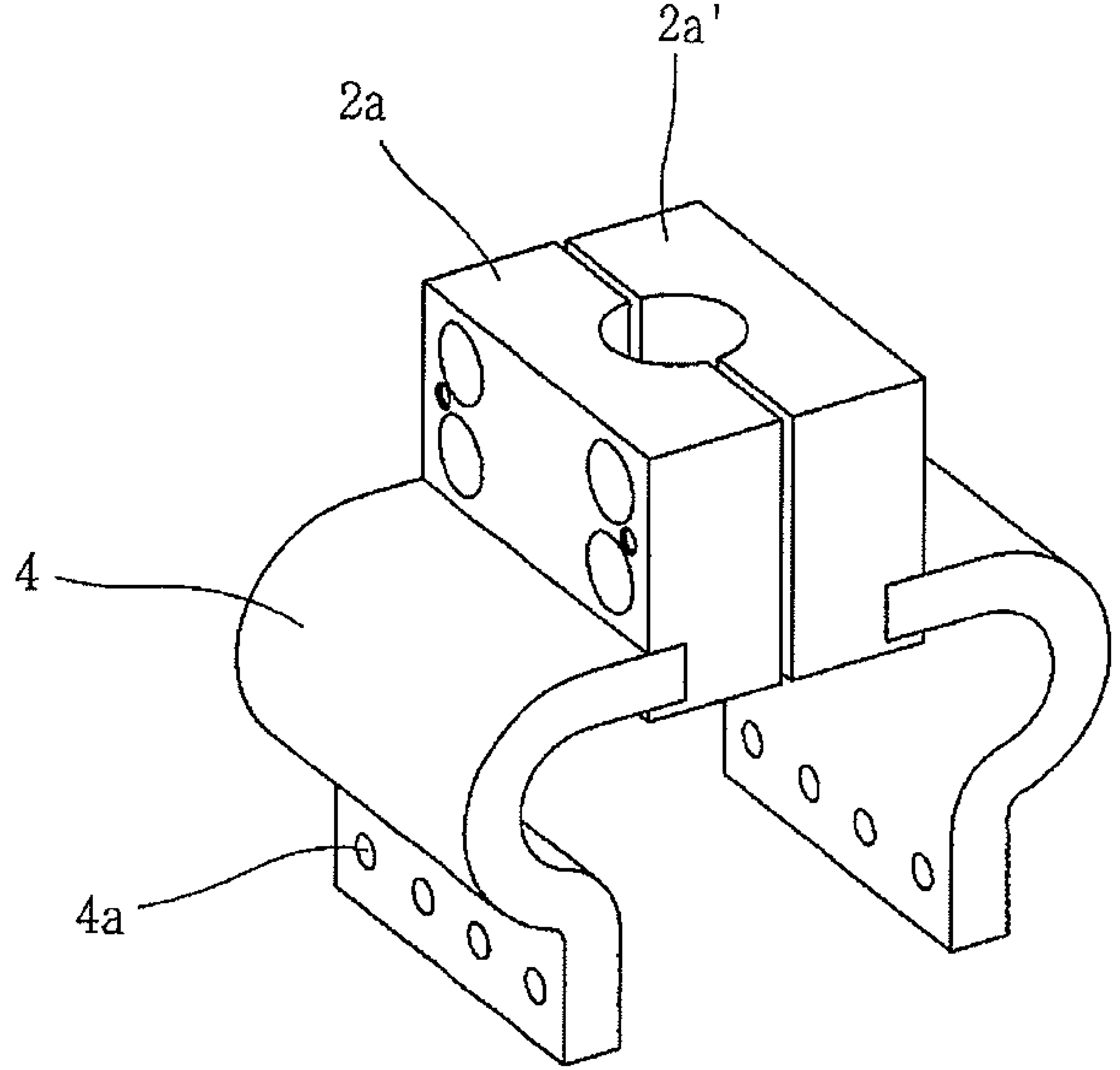
FIG. 5 is a perspective view showing an assembly of the clamp and a flexible shunt in the main circuit terminal assembly for the vacuum circuit breaker according to one exemplary embodiment of the present invention.

FIG. 5 is a perspective view showing an assembly of the clamp and a flexible shunt in the main circuit terminal assembly for the vacuum circuit breaker according to one exemplary embodiment of the present invention. As shown in FIG. 5, the assembly (connection) between the clamp and the flexible shunt in the main circuit terminal assembly for a vacuum circuit breaker according to the present invention is performed as follows:

First, the upper ends of the flexible shunt 4 are fitted into the respective slit portions (2*b* and 2*b*' in FIG. 3) disposed at the lower portion of the first and second clamp pieces 2*a* and 2*a*' of the clamp 2 and configured to have a longer length in a lengthwise direction than in a vertical direction. Then, the slit portions 2*b* and 2*b*' and the upper ends of the flexible shunt 4 are connected by welding, thus to complete the assembly of the clamp 2 and the flexible shunt 4. In FIG. 5, each lower portion of the flexible shunt 4 includes four fixing screw insertion holes 4*a* spaced from each other at a predetermined interval. Such fixing screw insertion holes 4*a* function as insertion holes for the bolts (not shown) used to connect the flexible shunt 4 to the terminal block 5 as shown in FIG. 1.

Description of the assembly process of the main circuit terminal assembly for a vacuum circuit breaker according to the present invention will be given in detail with reference to FIGS. 1 to 5.

Figure 3:
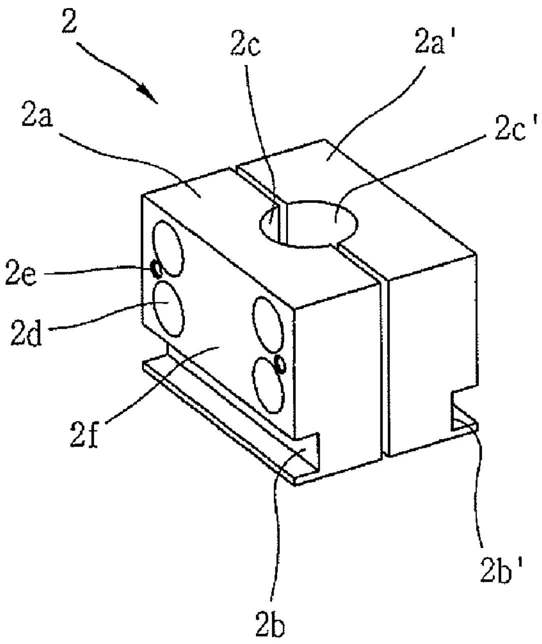
FIG. 3 is a perspective view showing a clamp in the main circuit terminal assembly for the vacuum circuit breaker according to one exemplary embodiment of the present invention.

As shown in FIGS. 2 and 3, the movable unit 1*a* extending from the lower portion of the vacuum interrupter 1 is inserted (fitted) between the first and second clamp pieces 2*a* and 2*a*', more specifically, between the pair of movable unit clamping grooves 2*c* and 2*c'*.

Next, the fastening means such as bolts and nuts (not shown) are inserted into the respective clamp fastening means insertion holes 2*d* for threaded coupling, thereby allowing the first and second clamp pieces 2*a* and 2*a*' to contact and support the movable unit 1*a*. Accordingly, the electric current may be conducted from the movable unit 1*a* toward the first and second clamp pieces 2*a* and 2*a'*.

Then, the heat sinks 3 are disposed on the respective upper surface portions 2*f* of the first and second clamp pieces 2*a* and 2*a*' such that the cooling fins 3*a* of the heat sink 3 are positioned vertically. Fixing screws are inserted into the respective fixing screw holes 3*b* of the heat sink 3 and the respective heat sink fixing screw insertion holes 2*e* of the clamp 2, thus to complete the assembly of the clamp 2 and the heat sink 3.

The upper end portions of the flexible shunt 4 are fitted into the slit portions 2*b* and 2*b'*, and the upper end portions of the flexible shunt 4 and the slit portions 2*b* and 2*b'* are welded for connection, thus to complete the assembly of the clamp 2 and the flexible shunt 4.

Then, the fixing screw insertion holes 4*a* configured at the lower portions of the flexible shunt 4 are aligned with the screw insertion holes (not shown) configured at both side surfaces of the terminal block 5 so as to be coupled to each other using bolts and nuts (not shown), thus to complete the assembly of the flexible shunt 4 and the terminal block 5. Here, the terminal block 5 and the contactor unit 6 are pre-assembled.

With such configuration, description of the operation of the main circuit terminal assembly for the vacuum circuit breaker according to the present invention will be given with reference to FIGS. 1 to 5.

A conductive current in an electrical circuit which is introduced from the fixed contact of the vacuum interrupter 1 and flow out to the load side via the contactor unit 6 and the terminal unit of the cradle (not shown) passes through, as shown in FIG. 1, the movable unit 1*a* of the vacuum interrupter 1. Then, the current passes through the clamp 2, the flexible shunt 4, the terminal block 5 and the contactor unit 6, sequentially, thereby flowing to the terminal unit of the cradle.

Here, heat generating between the movable unit 1*a* and the clamp 2 having the movable unit 1*a* therebetween may be effectively cooled down since the surface area of the clamp 2 is greatly increased by the heat sink 3 fixed to the clamp 2.

In addition, as shown in FIGS. 1 and 4, the cooling fins 3*a* of the heat sink 3 are vertically positioned for the convection of the air, thus to provide a passage (path) allowing the air to flow in a space between the cooling fins 3*a*. Therefore, the cooling effect for the clamp 2 may greatly be enhanced.

In addition, the connection unit between the clamp 2 and the flexible shunt 4 is configured in which the end portions of the flexible shunt 4 are inserted into the respective slit portions 2*b* and 2*b'* horizontally configured at the lower portions of the clamp 2 and connected by welding, thus to minimize an area of the clamp 2 to be contacted by the flexible shunt 4 as well as secure an enough area for contact with the heat sink.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A main circuit terminal assembly for a vacuum circuit breaker which is electrically connected to a vacuum interrupter, the main circuit terminal assembly comprising:

a clamp configured to electrically connect a movable unit of the vacuum interrupter, the clamp including a pair of conductors configured to support the movable unit by clamping;

a heat sink fixed to a surface of the clamp so as to increase a surface area of the clamp;

a flexible shunt having one end thereof electrically and mechanically connected to the clamp, and the flexible shunt including a flexible conductor configured to allow the movable unit to move;

a terminal block electrically and mechanically connected to the other end of the flexible shunt, and configured as an electrical conductor;

a contactor unit electrically connected to the terminal block and having a plurality of clip-shaped contactors; and the heat sink positioned in a space defined by the one end of the flexible shunt and the surface of the clamp.

2. The main circuit terminal assembly of claim 1, wherein the clamp has horizontal slit portions configured to insert end portions of the flexible shunt therein and to be connected thereto by welding, so as to secure an installation space of the heat sink by minimizing an area being contacted by the flexible shunt.

3. The main circuit terminal assembly of claim 2, wherein the clamp includes a pair of clamp pieces, and each of the clamp pieces comprises:

an upper flat surface portion for mounting the heat sink thereon; and the slit portion disposed at a lower portion thereof so as to insert the end portion of the flexible shunt and to be connected thereto by welding.

4. The main circuit terminal assembly of claim 1, wherein the heat sink includes a plurality of cooling fins vertically extending and spaced from each other at a predetermined interval that form a convection passage of air.

5. The main circuit terminal assembly of claim 2, wherein each of the clamp pieces includes a movable unit supporting groove vertically extending from a central portion of a rear surface thereof and having a semi-circle cross section such that the movable unit of the vacuum interrupter is fitted thereinto so as to be supported.

6. The main circuit terminal assembly of claim 2, further comprising:

a clamp fastener means fastening the pair of the clamp pieces so as to fit therein and support the movable unit of the vacuum interrupter between the pair of the clamp pieces.

7. The main circuit terminal assembly of claim 6, wherein the clamp fastener comprises bolts inserted into clamp fastener insertion holes provided at each clamp piece and nuts threaded-coupled to the bolts.

* * * * *